(12) United States Patent
Jung

(10) Patent No.: US 8,393,731 B2
(45) Date of Patent: Mar. 12, 2013

(54) FIXING STRUCTURE OF SIDE SHIELD FOR GLASSES

(75) Inventor: Sung Mo Jung, Gyeongsangbuk-do (KR)

(73) Assignee: Frame-Tec Co., Ltd., Daegu (KR)

( * ) Notice: Subject to any disclaimer, the term of this patent is extended or adjusted under 35 U.S.C. 154(b) by 0 days.

(21) Appl. No.: 13/287,580

(22) Filed: Nov. 2, 2011

(65) Prior Publication Data

US 2012/0212702 A1    Aug. 23, 2012

(30) Foreign Application Priority Data

Feb. 18, 2011    (KR) .................. 10-2011-0014770

(51) Int. Cl.
   *G02C 7/10* (2006.01)
(52) U.S. Cl. ................ 351/44; 351/121; 351/158; 2/449
(58) Field of Classification Search ............. 351/44, 351/111, 116, 121, 158; 2/12, 13, 448, 449, 2/450

See application file for complete search history.

(56) References Cited

U.S. PATENT DOCUMENTS

| 5,798,815 | A  | * | 8/1998  | Hirschman et al. | ............. 351/44 |
| 6,540,347 | B1 |   | 4/2003  | Radziwon et al.  |                     |
| 6,971,743 | B2 | * | 12/2005 | Jung             | ............. 351/44 |
| 7,163,288 | B1 | * | 1/2007  | Jung             | ............. 351/44 |

\* cited by examiner

*Primary Examiner* — Huy K Mai
(74) *Attorney, Agent, or Firm* — Lowe Hauptman Ham & Berner, LLP

(57) ABSTRACT

Disclosed therein is a structure for fixing a side shield of glasses, which is installed at a temple, wherein the side shield that surrounds a connection portion between the temple and a glasses frame is fixed at the temple by a fixture, and wherein the side shield located at the temple includes through holes respectively formed at upper and lower portions thereof; and guide portions respectively formed on the inner face of the side shield, and the fixture includes hook portions respectively formed at upper and lower ends thereof and inserted and caught to the through holes of the side shield, and the side shield further includes support pieces respectively formed at upper and lower portions of the inner or outer faces of the side shield for supporting the inside or outside of the hook portions of the fixture.

2 Claims, 6 Drawing Sheets

FIXING STRUCTURE OF SIDE SHIELD FOR GLASSES

CROSS REFERENCE TO RELATED APPLICATION

This application claims the priority of Korean Patent Application No. 10-2011-0014770, filed on Feb. 18, 2011, in the KIPO (Korean Intellectual Property Office), the disclosure of which is incorporated herein in their entirety by reference.

BACKGROUND OF THE INVENTION

1. Field of the Invention

The present invention relates to a structure for fixing a side shield of glasses for protecting user's eyes from being damaged by foreign substances which may get in between temples and a glasses frame, and more particularly, to a structure for fixing a side shield of glasses that anyone can easily assemble and firmly fix the side shield to the temple.

2. Background Art

In general, when wearing glasses, because there is a wide gap between a temple and a glasses frame and there may be many flying foreign substances in the air of a work site, the flying foreign substances may get in through the gap between the temple and the glasses frame. In this case, the foreign substances may damage a wearer's eyes when the foreign substances get in the eyes.

Accordingly, in order to overcome the above problems, a side shield is installed at a portion between the temple and the glasses frame. For this, a hole is perforated at a face where the side shield is attached, and a screw is fastened at the temple through the hole, so that the side shield is fixed at the temple.

However, the conventional technique of fixing the side shield at the temple through the screw-coupling has several problems in that an error rate is high and working efficiency is reduced because of a small size of the screw and difficulty in fastening the screw.

So, in order to overcome the problems of the prior art, as shown in FIG. 6, a fixture 104, which has through holes 103a formed at upper and lower portions of the inner face of the rear side of a side shield 103 that surrounds a portion between a temple 101 and a glasses frame 102, pressing members 104a formed at an inner side thereof, and a hook portion 104b formed at the upper and lower portions of the front side thereof, is inserted through an opening of the side shield 103. After that, the hook portion 104b of the fixture 104 is engaged at the through hole 103a of the side shield 103, so that the pressing members 104a of the fixture 104 are in close contact with the temple 101.

However, in case of the conventional structure of fixing the side shield using the fixture, the hook portion of the fixture may be separated from the through hole of the side shield when the side shield is widened and shaken, so that the fixture for fixing the side shield may be easily separated from the temple and the side shield may be easily lost.

SUMMARY OF THE INVENTION

Accordingly, the present invention has been made to solve the above-mentioned problems occurring in the prior arts, and it is an object of the present invention to provide a structure for fixing a side shield of glasses that anyone can easily assemble the side shield to a temple of glasses by easily attaching the side shield at the temple while grasping a fixture with a wearer's hand.

It is another object of the present invention to provide an improved structure for fixing a side shield of glasses at a temple by improving the structure around a through hole of the side shield for supporting the inside of a hook portion of the fixture, so that the side shield can be firmly fixed at the temple and easily prevent a separation of the fixture.

To accomplish the above object, according to the present invention, there is provided a structure for fixing a side shield of glasses, which is installed at a temple, wherein the side shield that surrounds a connection portion between the temple and a glasses frame is fixed at the temple by a fixture, and wherein the side shield located at the temple includes: through holes respectively formed at upper and lower portions thereof; and guide portions respectively formed on the inner face of the side shield, and the fixture includes hook portions respectively formed at upper and lower ends thereof and inserted and caught to the through holes of the side shield.

Particularly, the side shield further includes support pieces respectively formed at upper and lower portions of the inner face of the side shield for supporting the inside of the hook portions of the fixture.

Moreover, the fixture further includes: contact portions that are in close contact with sides of the temple; and a guide protrusion protrudingly formed on the contact portion, and the temple includes a guide groove formed on the inner face thereof to allow a movement of the guide protrusion of the fixture in a longitudinal direction of the temple.

According to the present invention, the structure for fixing the side shield of glasses allows the wearer to easily assemble the side shield to the temple because the wearer can easily attach the side shield to the temple while grasping the fixture with the wearer's hand.

Moreover, because the support pieces formed on the side shield support the inside of the hook portions of the fixture in the state where the side shield is fixed at the temple by the fixture, even though the side shield is widened, the support pieces get in closer contact with the inner face of the hook portions of the fixture, so that the hook portions of the fixture are not easily separated from the through holes of the side shield. Accordingly, the side shield can be more firmly fixed at the temple by the fixture because it is difficult to separate the fixture without using a special tool.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
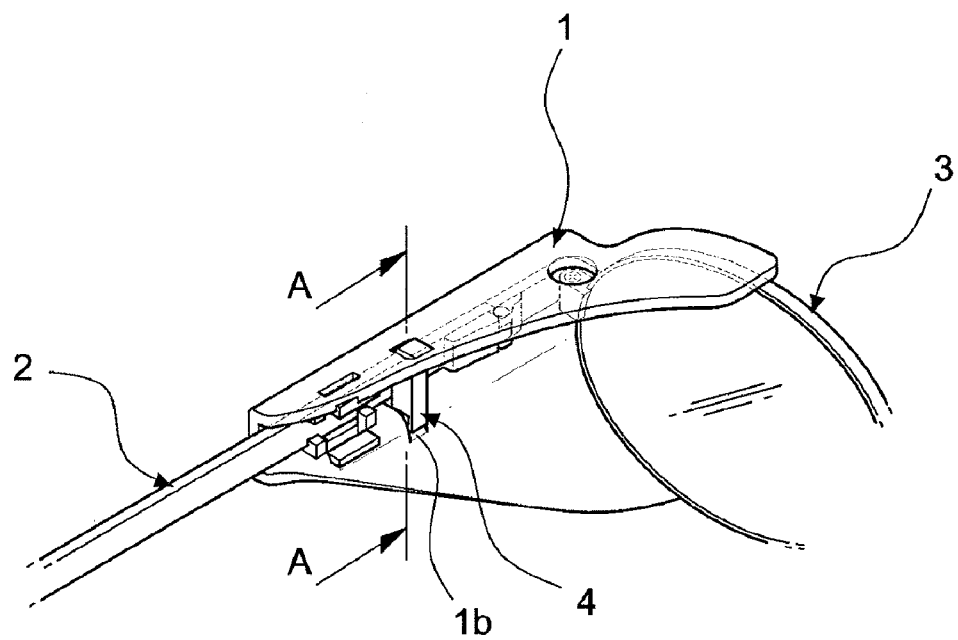
FIG. 1 is a partially perspective view of a structure for fixing a side shield of glasses according to the present invention.

Reference will be now made in detail to the preferred embodiment of the present invention with reference to the attached drawings.

FIGS. 1 to 4 are views illustrating a structure for fixing a side shield of glasses according to the present invention, in which the side shield 1 surrounds a connection portion between a temple 2 and a glasses frame 3, like the conventional glasses.

Here, the side shield 1 that surrounds a connection portion between the temple 2 and the glasses frame 3 is fixed at the temple 2 by a fixture 4.

The side shield 1 includes: through holes 1a respectively formed at upper and lower portions of the central part thereof; and guide portions 1b respectively formed on the inner face of the side shield 1 where the through holes 1a are located, so that the fixture 4 can be inserted into the side shield 1 along the guide portions 1b.

The fixture 4 includes hook portions 4a respectively formed at upper and lower portions thereof and respectively caught to the through holes 1a of the side shield 1, so that the side shield 1 can be firmly installed at the temple 2 by the fixture 4.

Furthermore, the fixture 4 further includes a contact portion 4b formed at the central portion of the fixture 4 and between the hook portions 4a, and hence, the contact portion 4b of the fixture 4 is in close contact with the inner face of the temple 2.

Moreover, when the temple 2 is folded and unfolded in a state where the side shield 1 is installed at the temple 2 by the fixture 4, the position of the side shield 1 may be varied along a longitudinal direction of the temple 2. Accordingly, in order to prevent the variation in position of the side shield 1, as shown in FIGS. 2 and 3, the present invention may include a structure that the fixture 4 is movable in the longitudinal direction of the temple 2 together with the side shield 1.

In other words, the fixture 4 includes the contact portions 4b that are in close contact with the sides of the temple 2 and a guide protrusion 4c protrudingly formed on the contact portion 4b, and the temple 2 includes an elongated guide groove 2a formed on the inner face thereof to allow an insertion of the guide protrusion 4c thereinto, so that the guide protrusion 4c of the fixture 4 can move along the longitudinal direction of the temple 2.

Figure 2:
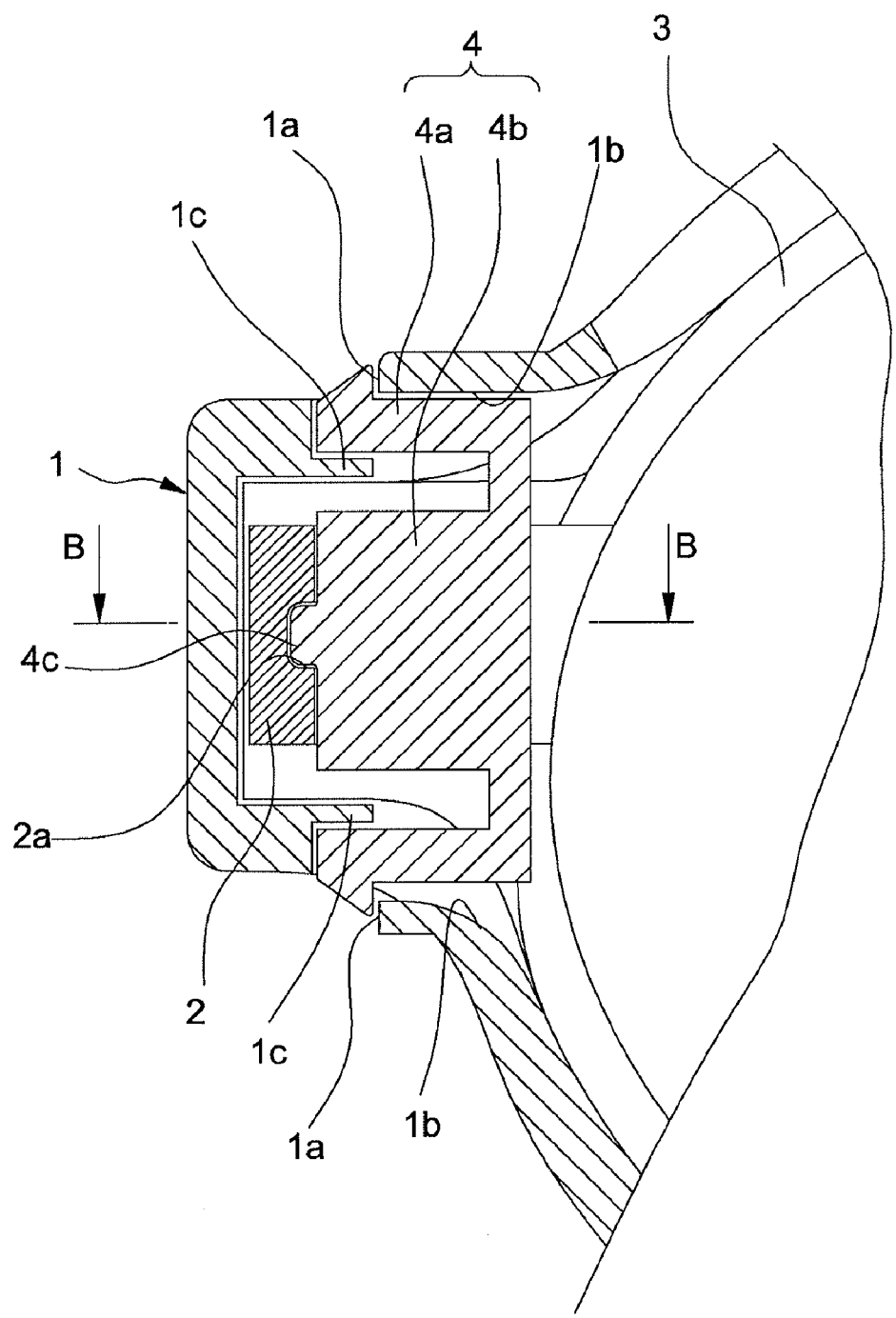
FIG. 2 is an enlarged sectional view taken along the line A-A of FIG. 1.
Figure 3:
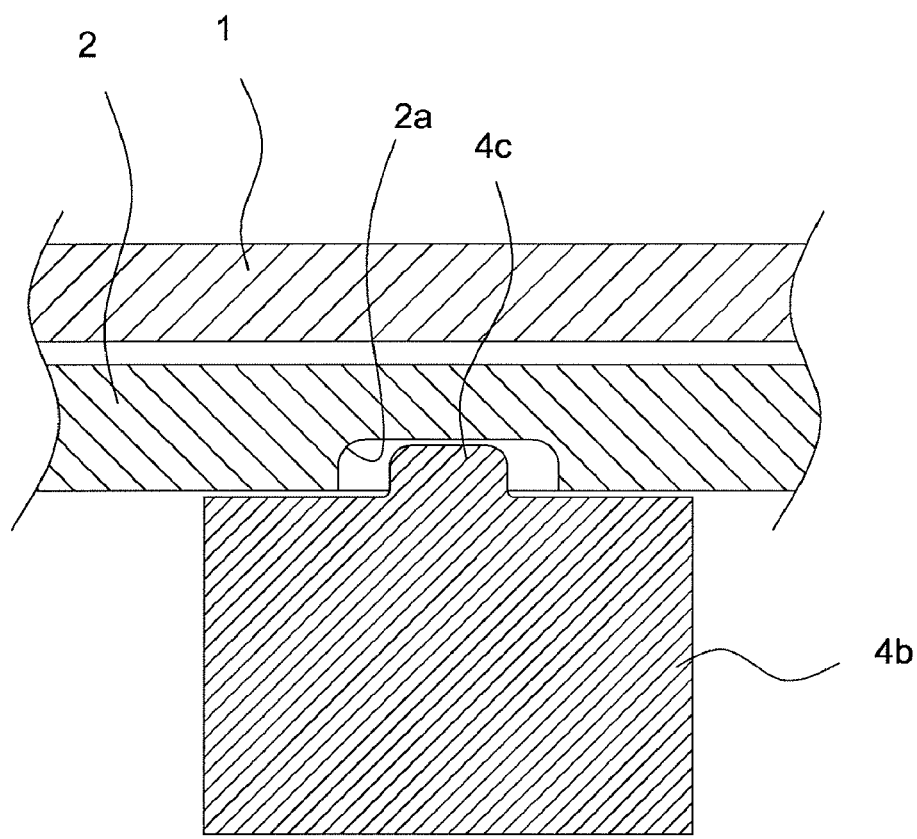
FIG. 3 is a sectional view taken along the line B-B of FIG. 2.
Figure 4:
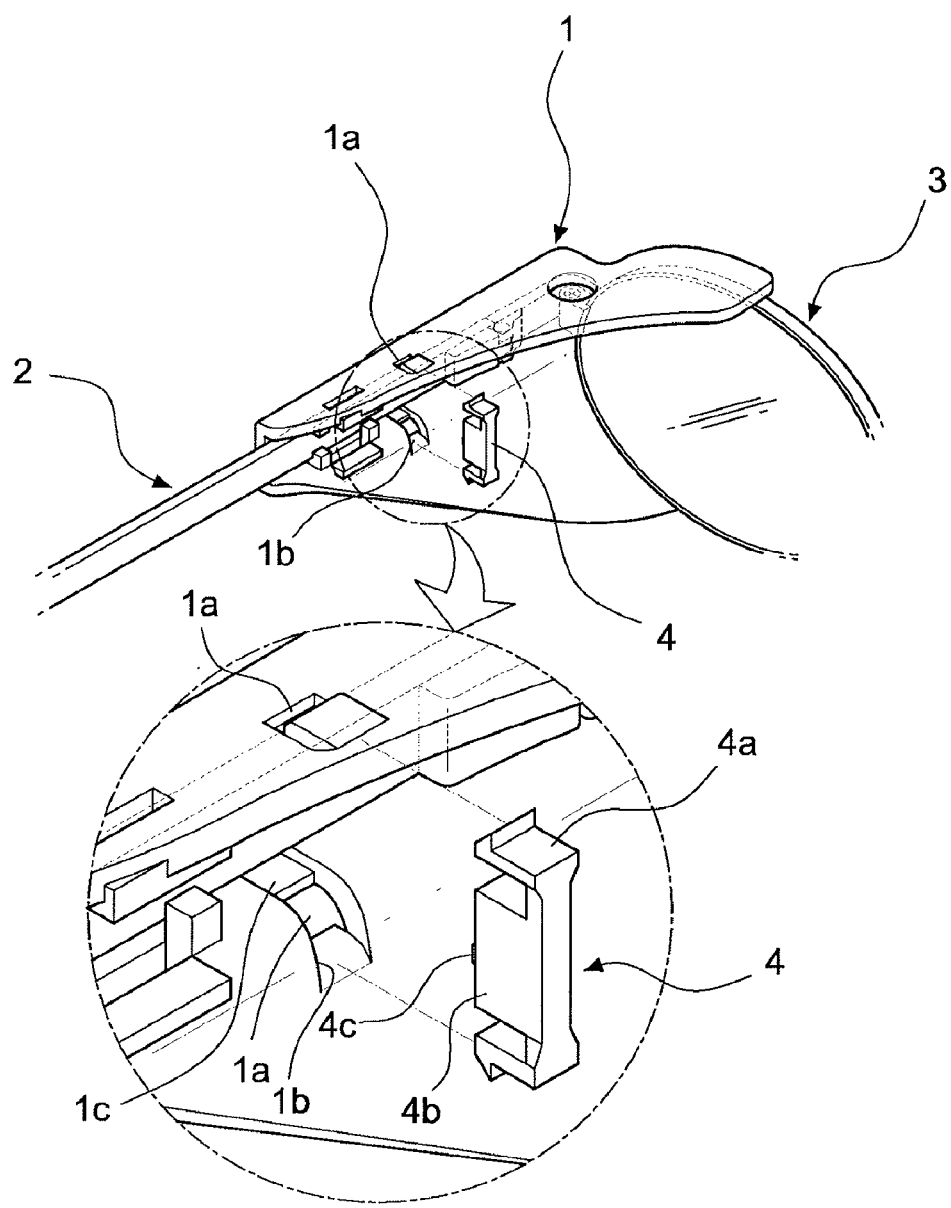
FIG. 4 is a perspective view illustrating a detached state of a fixture applied to the fixing structure of the side shield of glasses according to the present invention.

Particularly, in order to prevent a separation of the fixture from the side shield 1 even though the side shield 1 is widened in the state where the side shield 1 is fixed at the temple 2 by the fixture 4, as shown in FIGS. 2 and 4, in case that the hook portions 4a of the fixture 4 are formed on the outer face and caught to the through holes 1a of the side shield 1, support pieces 1c for supporting the inside of the hook portions 4a of the fixture 4 are respectively formed at upper and lower portions of the inner face of the side shield 1.

Figure 5:
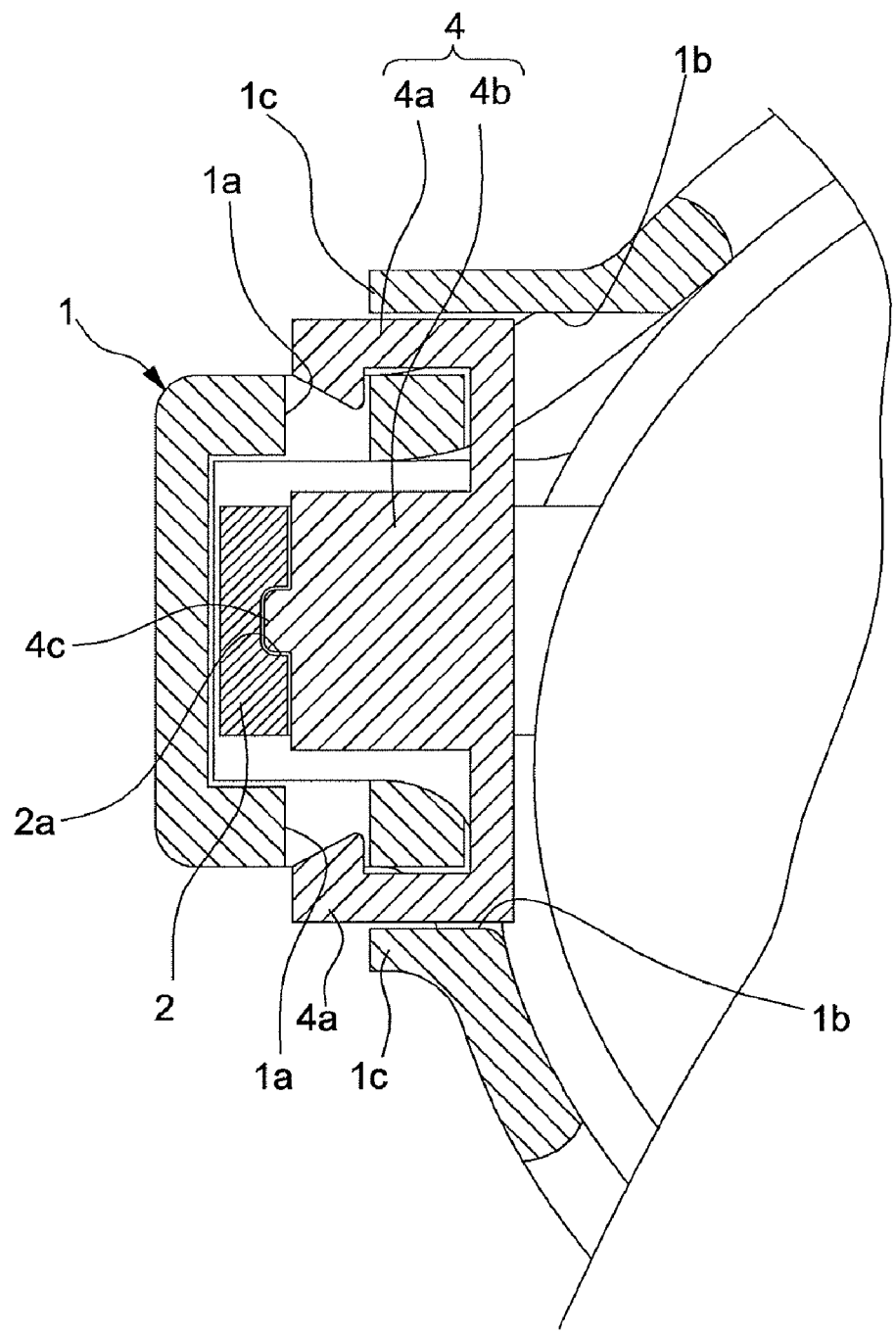
FIG. 5 is a sectional view of a structure for fixing a side shield of glasses according to another preferred embodiment of the present invention.
Figure 6:
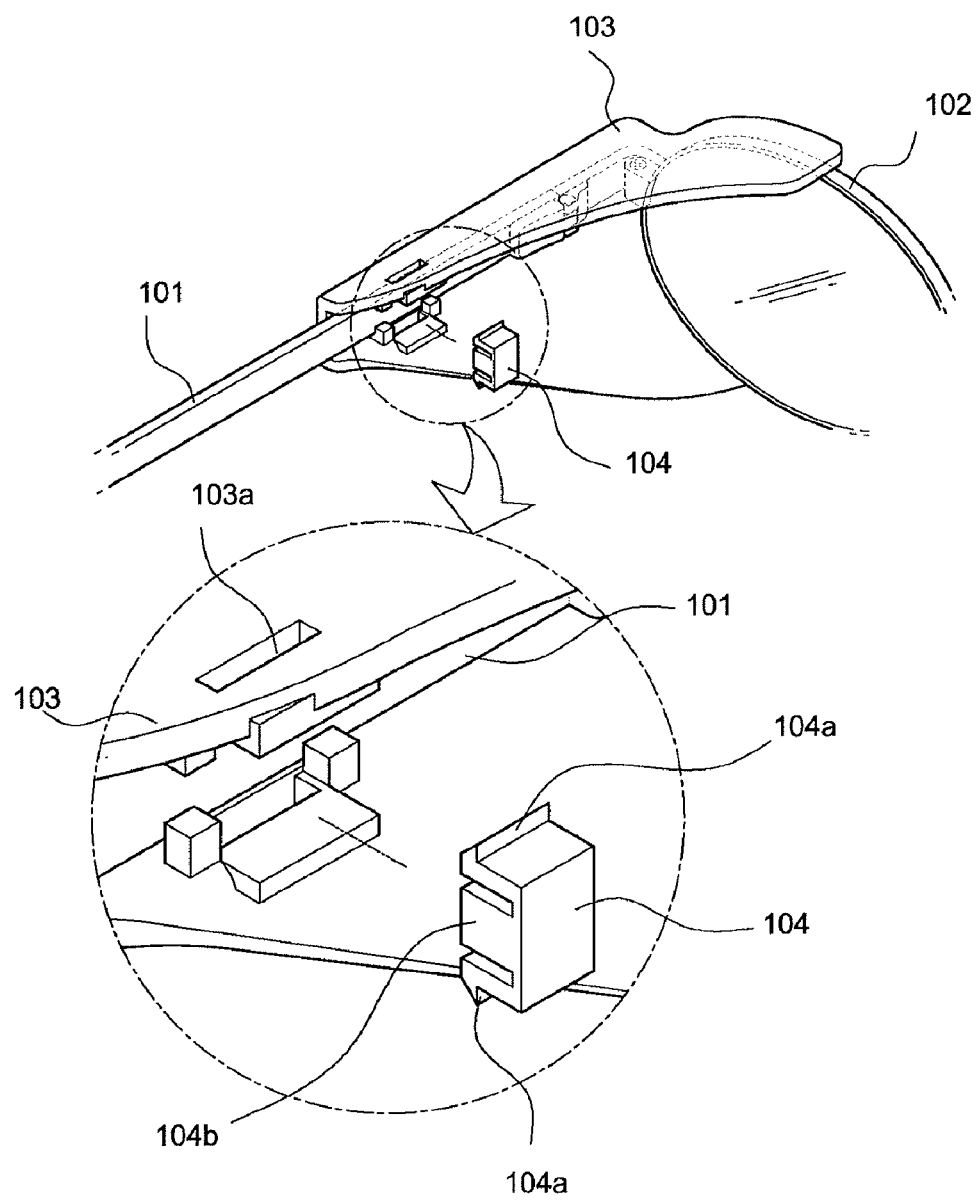
FIG. 6 is a partially perspective view of a structure for fixing a side shield of glasses according to the prior art.

As shown in FIG. 5, in case that the hook portions 4a of the fixture 4 are formed on the inner face and caught to the through holes 1a of the side shield 1, support pieces 1c for supporting the outside of the hook portions 4a of the fixture 4 are respectively formed at upper and lower portions of the outer face of the side shield 1.

Then, even though the side shield 1 is widened in the state where the side shield 1 is fixed at the temple 2 by the fixture, the support pieces 1c formed on the side shield 1 get in closer contact with the hook portions 4a of the fixture 4, so that the hook portions 4a of the fixture 4 are not easily separated from the through holes 1a of the side shield 1.

The action of the structure for fixing the side shield of the glasses according to the present invention is as follows.

First, the side shield 1 is arranged at the connection portion between the temple 2 and the glasses frame 3, and then, the fixture 4 is inwardly pushed along the guide portions 1b of the side shield 1 through an opening of the side shield 1.

Then, the hook portions 4a formed at the upper and lower portions of the fixture 4 are respectively caught to the through holes 1a formed at the upper and lower portions of the side shield 1 and are respectively supported by the support pieces 1c of the side shield 1.

Additionally, the contact portion 4b of the fixture 4 gets in close contact with the inner face of the temple 2, and the guide protrusion 4c of the fixture is inserted into the guide groove 2a of the temple 2.

Accordingly, in the state where the side shield 1 is installed at the temple 2 by the fixture 4, even though the side shield 1 is widened, the support pieces 1c of the side shield 1 get in closer contact with the hook portions 4a of the fixture 4, so that the hook portions 4a of the fixture 4 are more firmly caught to the through holes 1c of the side shield 1.

Furthermore, even though the position of the side shield 1 is varied in the longitudinal direction of the temple 2 when the temple 2 is folded and unfolded, because the guide protrusion 4c of the fixture 4 can move along the guide groove 2a of the temple 2, the positions of the side shield 1 and the fixture 4 can be smoothly varied in the longitudinal direction of the temple 2, so that the fixture 4 is protected from being damaged or separated from the side shield 1.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A structure for fixing a side shield of glasses, which is installed at a temple,
    wherein the side shield that surrounds a connection portion between the temple and a glasses frame is fixed at the temple by a fixture, and
    wherein the side shield located at the temple includes: through holes respectively formed at upper and lower portions thereof; and guide portions respectively formed on the inner face of the side shield, and the fixture includes hook portions respectively formed at upper and lower ends thereof and inserted and caught to the through holes of the side shield, and the side shield further includes support pieces respectively formed at upper and lower portions of the inner or outer faces of the side shield for supporting the inside or outside of the hook portions of the fixture.

2. The structure for fixing the side shield of glasses according to claim 1, wherein the fixture further includes: contact portions that are in close contact with sides of the temple; and a guide protrusion protrudingly formed on the contact portion, and the temple includes a guide groove formed on the inner face thereof to allow a movement of the guide protrusion of the fixture in a longitudinal direction of the temple.

* * * * *